US009401781B2

(12) United States Patent
Lehti et al.

(10) Patent No.: US 9,401,781 B2
(45) Date of Patent: Jul. 26, 2016

(54) HARQ ACKNOWLEDGMENT CHANNEL CODING FOR 4-CARRIER HSDPA MIMO

(75) Inventors: Arto Lehti, Oulu (FI); Teemu Sipila, Oulunsalo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/007,803

(22) Filed: Jan. 17, 2011

(65) Prior Publication Data

US 2012/0020264 A1 Jan. 26, 2012

Related U.S. Application Data

(60) Provisional application No. 61/336,151, filed on Jan. 15, 2010.

(51) Int. Cl.
*H04L 1/16* (2006.01)
*H04L 1/00* (2006.01)
*H04L 1/18* (2006.01)

(52) U.S. Cl.
CPC ............ *H04L 1/1671* (2013.01); *H04L 1/0071* (2013.01); *H04L 1/0026* (2013.01); *H04L 1/1812* (2013.01)

(58) Field of Classification Search
CPC ................ H04W 52/0255; H04W 52/0206; H04W 52/0209; H04W 52/02; H04W 52/0203; H04W 84/12
See application file for complete search history.

(56) References Cited

U.S. PATENT DOCUMENTS 7,961,700 B2 * 6/2011 Malladi ............... H04B 1/70735 370/345
8,854,976 B2 * 10/2014 Xi .......................... H04L 5/001 370/225
2003/0043764 A1 3/2003 Kim et al. ...................... 370/329
2005/0239409 A1 * 10/2005 Oh et al. ...................... 455/67.11
2007/0253370 A1 11/2007 Khan et al.
2008/0259863 A1 * 10/2008 Zhang .................. H04L 5/0005 370/329
2009/0074098 A1 * 3/2009 Wu et al. ........................ 375/260
2009/0245212 A1 * 10/2009 Sambhwani et al. .......... 370/336

(Continued)

FOREIGN PATENT DOCUMENTS

EP 1898535 A2 3/2008
EP 1901494 A1 3/2008

(Continued)

OTHER PUBLICATIONS

International Search Report and Written Opinion, received in corresponding Patent Cooperation Treaty Application No. PCT/IB2011/050199. Dated Mar. 28, 2011. 13 Pages.

(Continued)

*Primary Examiner* — Hassan Phillips
*Assistant Examiner* — Prenell Jones
(74) *Attorney, Agent, or Firm* — Harrington & Smith

(57) ABSTRACT

In accordance with the exemplary embodiments of the invention there is at least a method, computer program, and apparatus for operating a receiver using at least four carriers to receive transport blocks from a transmitter, to compose a first codeword to acknowledge at least one of a reception and a lack of reception of individual transport blocks in a first part of the at least four carriers, to compose a second codeword to acknowledge at least one of a reception and a lack of reception of individual transport blocks in a second part of the at least four carriers, and to transmit the first codeword and the second codeword to the transmitter during one slot.

25 Claims, 5 Drawing Sheets

(56) References Cited

U.S. PATENT DOCUMENTS

| | | |
|---|---|---|
| 2010/0034303 A1* | 2/2010 | Damnjanovic et al. ....... 375/260 |
| 2010/0172428 A1* | 7/2010 | Pani et al. ..................... 375/262 |
| 2010/0202348 A1* | 8/2010 | Sambhwani .................. 370/328 |
| 2011/0243066 A1* | 10/2011 | Nazar et al. ................... 370/328 |
| 2011/0299489 A1* | 12/2011 | Kim et al. ..................... 370/329 |
| 2013/0329678 A1* | 12/2013 | Pan et al. ...................... 370/329 |

FOREIGN PATENT DOCUMENTS

| | | |
|---|---|---|
| KR | 20030060387 A | 7/2003 |
| WO | 2006116102 A2 | 11/2006 |
| WO | 2009120797 A1 | 10/2009 |
| WO | 2009132290 A2 | 10/2009 |
| WO | 2009157849 A1 | 12/2009 |

OTHER PUBLICATIONS

Lee, In-Ho, "Efficient Spreading Factor Selection for Retransmissions of Non-Real Time Data in DS/CDMA", Personal, Indoor and Mobile radio Communications, 2003. PIMRC 2003. 14th IEEE Proceedings on Sep. 7-10, 2003, vol. 2, pp. 1471-1475.

Seidel, Eiko, "White Paper—Dual Cell HSDPA and it's Future Evolution", Jan. 2009, Nomor Research.

"3rd Generation Partnership Project; Technical Specification Group Radio Access Network; Multiplexing and Channel Coding (FDD) (Release 9)", 3GPP TS 25.212, v9.1.0, Dec. 2009, pp. 1-108.

"3rd Generation Partnership Project; Technical Specification Group Radio Access Network; Physical layer procedures (FDD) (Release 9)", 3GPP TS 25114, v9.1.0, Dec. 2009, pp. 1-98.

"3rd Generation Partnership Project; Technical Specification Group Radio Access Network; Multiplexing and Channel Coding (FDD)(Release 10)", 3GPP TS 25.212, v10.0.0, Sep. 2010, pp. 1-114.

3GPP TS 25.214 V9.1.0 (Dec. 2009), Technical Specification, $3^{rd}$ Generation Partnership Project; Technical Specification Group Radio Access Network; Physical Layer Procedures (FDD), (Release 9), (98 pages).

3GPP TS 25.212 V9.1.0 (Dec. 2009), Technical Specification, $3^{rd}$ Generation Partnership Project; Technical Specification Group Radio Access Network; Multiplexing and Channel Coding (FDD), (Release 9), (108 pages).

"Considerations of HS-DPCCH Design for 4-carrier HSDPA", InterDigital Communications, LLC, 3GPP TSG-RAN WG1 Meeting #59bis, R1-100470, Jan. 2010, 5 pgs.

* cited by examiner

HARQ ACKNOWLEDGMENT CHANNEL CODING FOR 4-CARRIER HSDPA MIMO

CROSS-REFERENCE TO RELATED APPLICATIONS

This patent application claims priority under 35 U.S.C. §119(e) from Provisional Patent Application No. 61/336,151, filed Jan. 15, 2010, the disclosure of which is incorporated by reference herein in its entirety.

TECHNICAL FIELD

The exemplary and non-limiting embodiments of this invention relate generally to wireless communication systems, methods, devices and computer programs and, more specifically, relate to uplink hybrid automatic repeat request (HARQ) signaling between a mobile unit and a network access node.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BS base station (NodeB)
CQI channel quality indicator
DC dual carrier
DCH downlink dedicated channel
DL downlink (NodeB towards UE)
DPCCH dedicated physical control channel
DSCH downlink shared channel
DTX discontinuous transmission
GGSN gateway general packet radio service support node
HARQ hybrid automatic repeat request
HS high speed
HSPA high speed packet access
HSDPA high speed downlink packet access
MIMO multiple input multiple output
NodeB base station
Rel release
SCCH shared control channel
SGSN serving general packet radio service support node
UE user equipment, such as a mobile station, mobile node or mobile terminal
UL uplink (UE towards NodeB)

FIG. 1 shows a simplified block diagram of a HSPA system and network 1.A user terminal, which can be referred to as user equipment (UE) 10, is wireless connected during operation with a NodeB 12. The NodeB 12 is connected via an interface (Iub) to a radio network controller (RNC) 14 that in turn is connected via an interface (Iu) to a core network 16 containing a SGSN and a GGSN.

A problem that arises in relation to HSPA relates to HSPA HARQ signaling for four carrier (4-carrier) MIMO implementations of HSPA.

SUMMARY

In an exemplary aspect of the invention there is a method comprising operating a receiver using at least four carriers to receive transport blocks from a transmitter, composing a first codeword to acknowledge at least one of a reception and a lack of reception of individual transport blocks in a first part of the at least four carriers, composing a second codeword to acknowledge at least one of a reception and a lack of reception of individual transport blocks in a second part of the at least four carriers, and transmitting the first codeword and the second codeword to the transmitter during one slot.

In another exemplary aspect of the invention there is an apparatus comprising at least one processor, and at least one memory including computer program code, where the at least one memory and the computer program code are configured, with the at least one processor, to cause the apparatus to at least operate a receiver using at least four carriers to receive transport blocks from a transmitter, compose a first codeword to acknowledge at least one of a reception and a lack of reception of individual transport blocks in a first part of the at least four carriers, compose a second codeword to acknowledge at least one of a reception and a lack of reception of individual transport blocks in a second part of the at least four carriers, and transmit the first codeword and the second codeword to the transmitter during one slot.

In yet another exemplary aspect of the invention there is method comprising operating a transmitter using at least four carriers to transmit transport blocks to a receiver, and receiving a first codeword and a second codeword from the receiver in a single slot, where one codeword acknowledges at least one of a reception and a lack of reception of individual transport blocks in a first part of the at least four carriers, and where another codeword indicates a lack of reception of individual transport blocks in a second part of the at least four carriers by the receiver.

In still another exemplary aspect of the invention there is an apparatus comprising at least one processor, and at least one memory including computer program code, where the at least one memory and the computer program code are configured, with the at least one processor, to cause the apparatus to at least operate a transmitter using at least four carriers to transmit transport blocks to a receiver, and receive a first codeword and a second codeword from the receiver in a single slot, where one codeword acknowledges at least one of a reception and a lack of reception of individual transport blocks in a first part of the at least four carriers, and where another codeword indicates a lack of reception of individual transport blocks in a second part of the at least four carriers by the receiver.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 1 shows a simplified block diagram of a HSPA network.

FIG. 2 shows a simplified block diagram of various electronic devices that are suitable for use in practicing the exemplary embodiments of this invention.

FIG. 3 shows HARQ ACK for Rel-9 dual carrier MIMO.

FIG. 4 shows HARQ ACK for Rel-10 4-carrier MIMO.

FIGS. 5, 6, 7, and 8 are each a logic flow diagram that illustrates the operation of a method, and a result of execution of computer program instructions embodied on a computer readable memory, in accordance with the exemplary embodiments of this invention.

DETAILED DESCRIPTION

Reference with regard to the exemplary embodiments of this invention can be made to 3GPP TS 25.212 V9.1.0 (2009-

12) Technical Specification 3rd Generation Partnership Project; Technical Specification Group Radio Access Network; Multiplexing and channel coding (FDD) (Release 9), in particular sections 4.7.3A and 4.7.3B, as well as to 3GPP TS 25.214 V9.1.0 (2009-12) Technical Specification 3rd Generation Partnership Project; Technical Specification Group Radio Access Network; Physical layer procedures (FDD) (Release 9), in particular section 6A.1.1.

Figure 1:
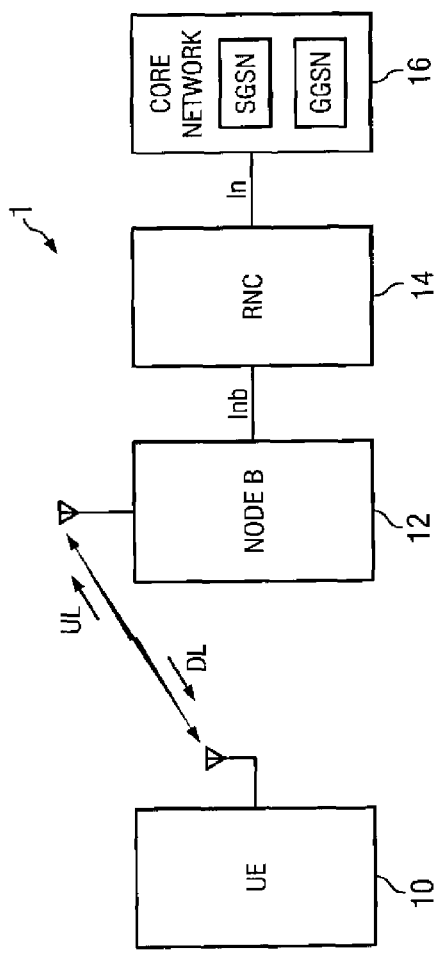
Figure 2:
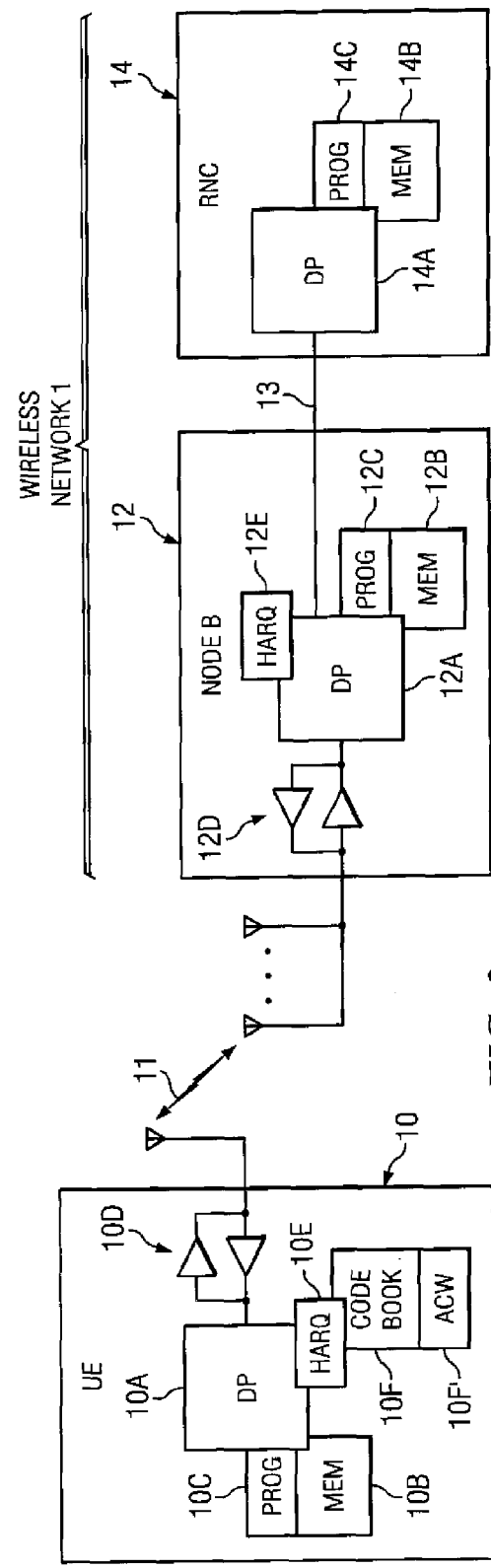

Reference is made to FIG. 2 for illustrating a simplified block diagram of various electronic devices and apparatus that are suitable for use in practicing the exemplary embodiments of this invention. In FIG. 2 the wireless network 1 is adapted for communication over a wireless link 11 with an apparatus, such as a mobile communication device which may be referred to as a UE 10, via a network access node, such as a NodeB 12 (base station). The network 1 may include a network control element that may include the RNC 14 functionality shown in FIG. 1, and which provides connectivity (via the core network) with a further network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the NodeB 12 via one or more antennas. The NodeB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 using multiple antennas. The NodeB 12 can be coupled via a data/control path 13 to the RNC 14. The path 13 may be implemented as the Iub interface shown in FIG. 1. The RNC 14 is assumed to also include at least one data processor 14A and memory 14 storing a program 14C.

For the purposes of describing the exemplary embodiments of this invention the UE 10 is assumed to also include a HARQ block (function) 10E, and the NodeB 12 also includes a HARQ block 12E. The HARQ block 10E is assumed to include a codebook 10F containing codewords and, in accordance with the exemplary embodiments of this invention as described below, at least one additional codeword (ACW) 10F'. Note that the codebook 10F can be stored as a data structure in the memory 10B. Each of the codewords may be, for example, 10 bits in length.

The PROGs 10C and 12C are assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and by the DP 12A of the NodeB 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

Tuning now to the exemplary embodiments of this invention, it is noted first that when four carriers in the DL have MIMO there are eight transport blocks transmitted from the NodeB 12 to the UE 10. The UE 10 has to acknowledge each transport block with an ACK (block received correctly) or with a NACK (block received incorrectly).

For this to occur there needs to be procedure to signal the eight independent HARQ ACK/NACK indicators to the NodeB 12. Currently 3GPP Release 9 (Rel-9) specifies a technique to signal four independent HARQ Acknowledgment indicators. However, this technique is not sufficient for use with 4-carrier HSDPA MIMO.

Figure 3:
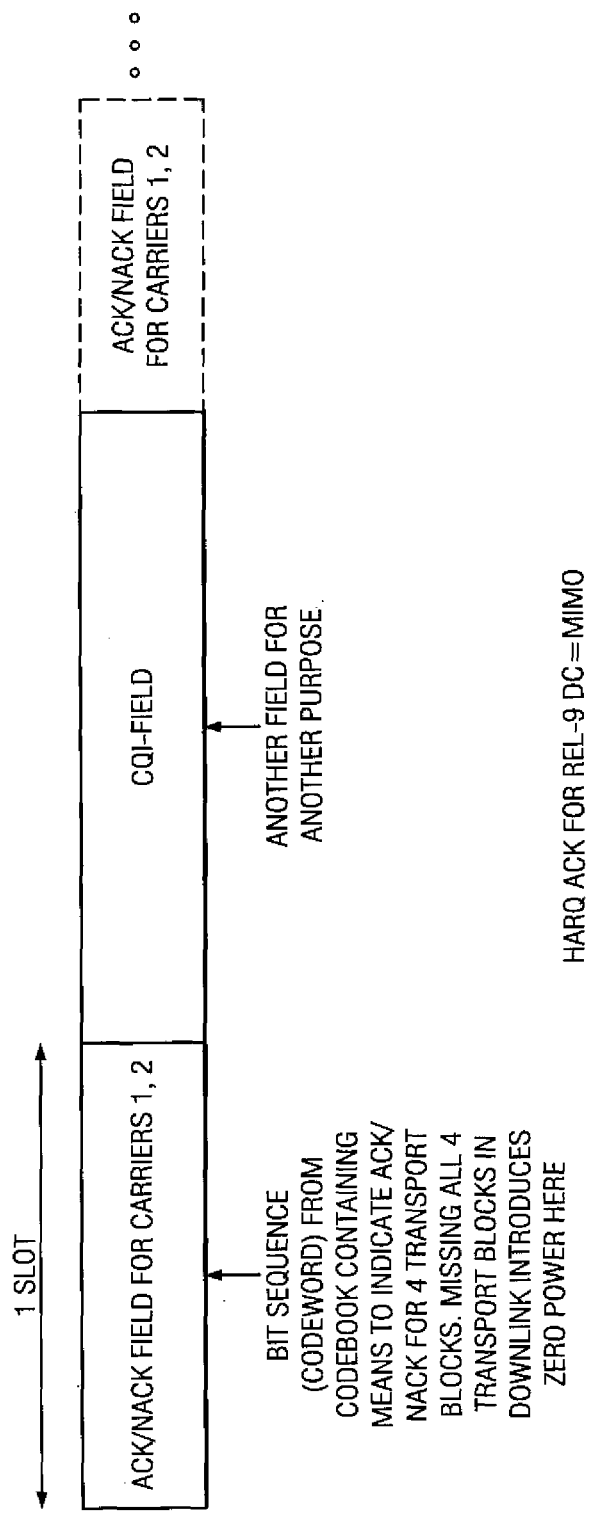

FIG. 3 shows a technique specified in 3GPP Rel-9 to signal the four independent HARQ Acknowledgment indicators for Dual-Carrier (DC) MIMO HSDPA. This is accomplished in the UL HS-DPCCH channel by way of sending a bit sequence that represents a codeword selected from the codebook (CB) 10F that forms a part of the HARQ block or function 10E of the UE 10. One codeword specifies, for example, (ACK, ACK, ACK, ACK), while another codeword specifies (NACK, ACK, ACK, ACK), indicating that the first transport block was received erroneously while the second, third and fourth transport blocks were received correctly. However, if the UE 10 does not receive both carriers, i.e., all of the transport blocks (such as by missing the downlink HS-SCCHs), then the UE 10 transmits nothing (transmits DTX) in the HS-DPCCH. The CQI field shown in FIG. 3 is not germane to this discussion.

One potential technique to transmit eight independent HARQ Acknowledgment indicators can be to lower the spreading factor (SF) of the HS-DPCCH from 256 (currently) to 128 to create twice the amount of space for HARQ Acknowledgment indicators. The first half of this space can be used to transmit four indicators for two of the carriers, as in Rel-9. The second half of the space can then be used to transmit the additional four indicators for the other two carriers. For convenience, one can refer to these as two "carrier groups".

However, a problem would be presented is that earlier 3GPP releases have followed a design rule that the transmit power level should not change during (e.g., in the middle of) the HS-DPCCH slot. That would occur if, for some reason, there is a need to transmit an Acknowledgment for one of the carrier groups and not the other. For example, this situation may arise in a case where there is some scheduled data in one of the carrier groups and not the other. Also, the DTX detection in the NodeB 12 should be correspondingly changed so that it is based on half slots, as opposed to whole slots. Clearly, this has the potential to reduce the performance of the DTX detection algorithm of the NodeB 12.

Figure 4:
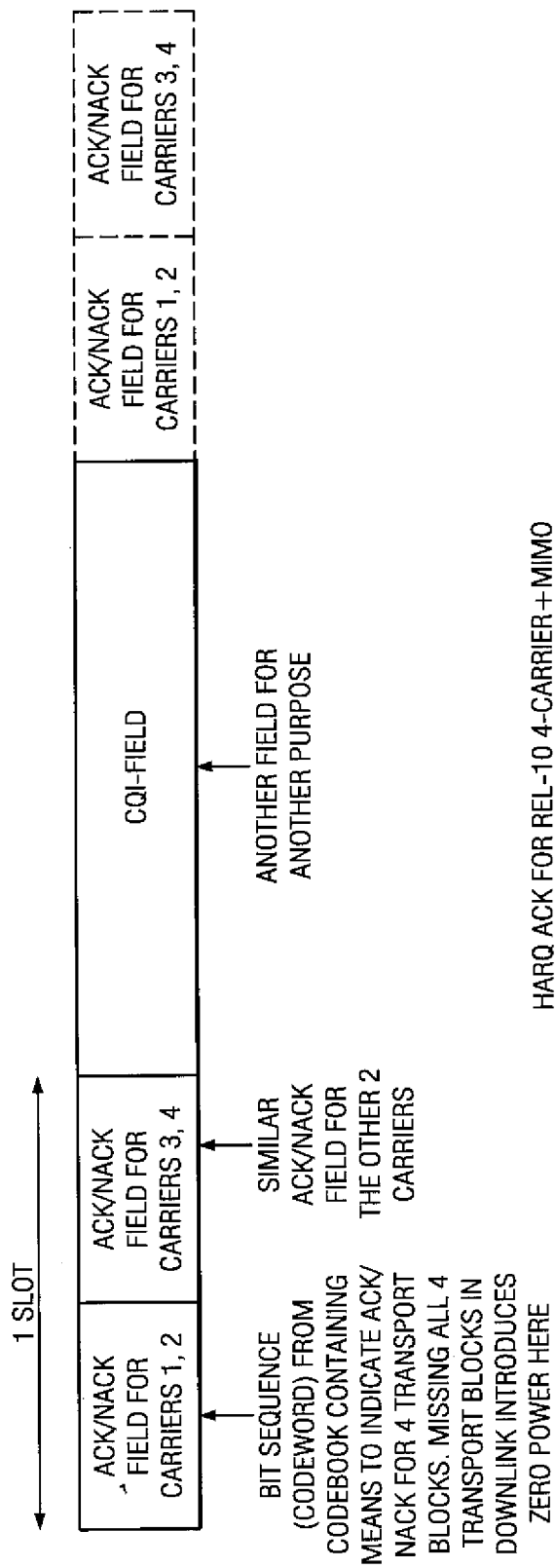

FIG. 4 shows two ACK/NACK fields concatenated one after the other within the single slot time of the HARQ ACK (Physical channel structure) for Rel-10 4-carrier MIMO. This is but one possible technique to arrange the two ACK/NACK fields. Another possibility would be, for example, to interleave the two codewords over the slot to improve performance.

As was noted above, if the UE 10 misses all of the transport blocks in the Rel-9 DC MIMO HSDPA, i.e., it misses the HS-SCCH and "does not hear anything", then the UE 10 transmits nothing (transmits DTX) in the HS-DPCCH.

In accordance with the exemplary embodiments of this invention, two concatenated Dual-Carrier MIMO HS-DPCCH ACK/NACK messages are used as an acknowledgment for the 4-carrier HSDPA MIMO, both of which may have the currently specified (e.g., Rel-9) codebook 10F. However, the codebook 10F can be modified to contain a new codeword, the additional codeword 10F', that is transmitted instead of DTX. That is, certain exemplary embodiments add the additional codeword 10F' to the codebook (CB) 10F to indicate that no transmission was received in the DL for at least one of the two carrier groups such that the concatenated (possibly interleaved) codewords can be used for the case of 4-carrier MIMO. The additional codeword 10F' is transmitted as an Acknowledgment for the carrier group, in the case where no data is received, in a case there is a need to acknowledge data in one of the carrier groups and not the other. In this manner the NodeB 12 is enabled to correctly interpret the received HARQ acknowledgment, without receiving a DTX from the UE 10. That is, the NodeB 12 may interpret one of the HARQ Acknowledgments for one of the 2-carrier carrier groups in a conventional manner, while interpreting the other HARQ Acknowledgment codeword in a novel manner as indicating that the corresponding carrier group was not received (for some reason) by the UE 10. As such, a change in transmission power in the middle of the slot can be avoided and the transmit power level maintained consistent over the entire UL slot. If neither of the carrier groups is received by the UE 10, then DTX can be used for both HARQ Acknowledgement fields, i.e. for the whole slot. In this way if the UE 10 does not receive any data in any of the carrier groups it does not have to transmit the acknowledgement in the UL. This is consistent with the solution in earlier 3GPP releases. However, as opposed to using DTX it is also within the scope of the exemplary embodiments to send codeword 10F' twice in the slot, either concatenated or interleaved.

It should be noted that the exemplary embodiments of this invention can also be used in the case where the ACK/NACK fields are transmitted using separate SF256 (Spreading factor 256) channelization codes to improve DTX performance. That is, the exemplary embodiments can also be applied to advantage in a case where a 2×SF256 scheme is used for transmission of ACK/NACKS.

Further, it is noted that the previous ACK/NACK codes contain PRE/POST codewords used as pre-ambles and post-ambles. Further in accordance with the exemplary embodiments the can be re-interpreted as the new codeword for indicating the lack of reception of a carrier group.

Additionally, it is noted that the exemplary embodiments of the invention can be applied to systems using more than four carriers and more than two code words and ACK/NACK fields. For example, by providing two 4-carrier HS-DPCCH solutions on separate spreading codes, or separate UL carriers. Also by reducing the spreading factor by 2 and concatenating four ACK/NACK fields to one slot.

Based on the foregoing it should be apparent that the exemplary embodiments of this invention provide a method, apparatus and computer program(s) to improve the HARQ Acknowledgment signaling between the UE 10 and the NodeB 12.

Figure 5:
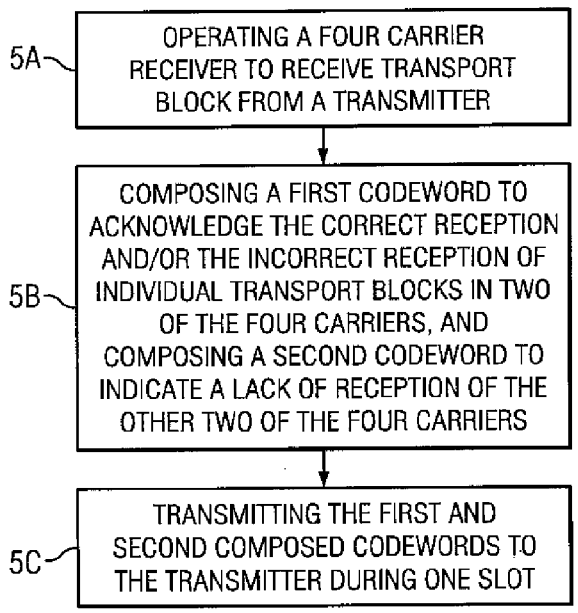

FIG. 5 is a logic flow diagram that illustrates the operation of a method, and a result of execution of computer program instructions, in accordance with the exemplary embodiments of this invention. In accordance with these exemplary embodiments a method performs, at Block 5A, a step of operating a four carrier receiver to receive transport blocks from a transmitter. At Block 5B there is a step of composing a first codeword to acknowledge the correct reception and/or the incorrect reception of individual transport blocks in two of the four carriers, and composing a second codeword to indicate a lack of reception of the other two of the four carriers. At Block 5C there is a step of transmitting the first and second composed codewords to the transmitter during one slot.

In the example method of FIG. 5, where the first and second codewords are concatenated one after the other in the slot.

In the example method of FIG. 5, where the first and second codewords are interleaved in the slot.

Figure 6:
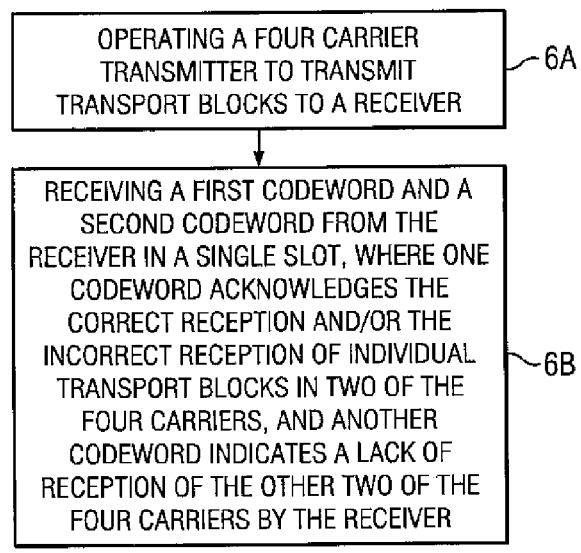

FIG. 6 is a logic flow diagram that illustrates the operation of a method, and a result of execution of computer program instructions, further in accordance with the exemplary embodiments of this invention. In accordance with these exemplary embodiments a method performs, at Block 6A, a step of operating a four carrier transmitter to transmit transport blocks to a receiver. At Block 6B there is a step of receiving a first codeword and a second codeword from the receiver in a single slot, where one codeword acknowledges the correct reception and/or the incorrect reception of individual transport blocks in two of the four carriers, and another codeword indicates a lack of reception of the other two of the four carriers by the receiver.

In the example method of FIG. 6, where the first and second codewords are concatenated one after the other in the slot.

In the example method of FIG. 6, where the first and second codewords are interleaved in the slot.

Figure 7:
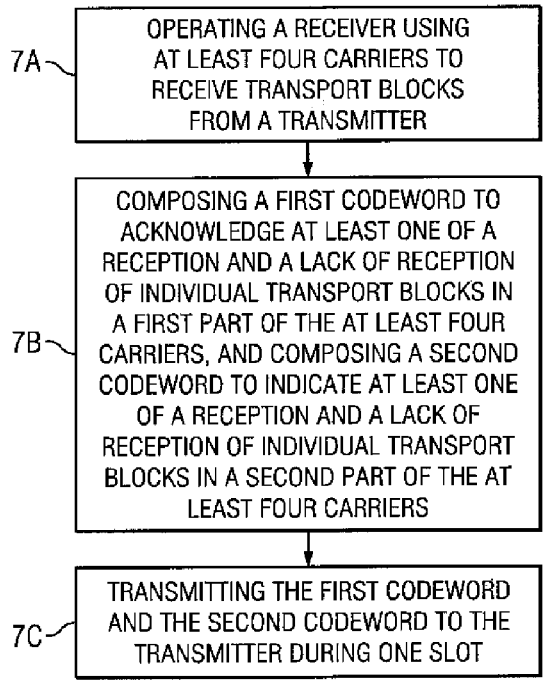

FIG. 7 is a logic flow diagram that illustrates the operation of a method, and a result of execution of computer program instructions, further in accordance with the exemplary embodiments of this invention. In accordance with these exemplary embodiments a method performs, at Block 7A, a step of operating a receiver using at least four carriers to receive transport blocks from a transmitter. At Block 7B there is a step of composing a first codeword to acknowledge at least one of a reception and a lack of reception of individual transport blocks in a first part of the at least four carriers, and composing a second codeword to acknowledge at least one of a reception and a lack of reception of individual transport blocks in a second part of the at least four carriers. At Block 7C there is a step of transmitting the first codeword and the second codeword to the transmitter during one slot.

Further, in accordance with the example method of FIG. 7 above the first codeword and second codeword is transmitted in an acknowledgement message during the slot.

In accordance with the example method of FIG. 7 as indicated in the paragraph above the acknowledgement message is 20 bits.

Additionally, in accordance with the example method of FIG. 7 as indicated in the paragraphs above the first codeword and the second codeword are one of concatenated or interleaved in the acknowledgement message.

Further, in accordance with the example method of FIG. 7 as indicated in the paragraphs above at least one codeword transmitted to the transmitter during the slot comprises a discontinuous transmission message if no transport blocks is received in the corresponding part of the at least four carriers.

Additionally, in accordance with the example method of FIG. 7 as indicated in the paragraphs above the receiver is configured to use eight carriers, the actions further comprise composing a third codeword to acknowledge at least one of a reception and a lack of reception of individual transport blocks in a third part of the eight carriers, composing a fourth codeword to acknowledge at least one of a reception and a lack of reception of individual transport blocks in a fourth part of the eight carriers, and transmitting the third codeword and the fourth codeword to the transmitter during the one slot.

Further, in accordance with the example method of FIG. 7 as indicated in the paragraph above the transmitting comprises one of concatenating or interleaving the first codeword and the second codeword with the third codeword and the fourth codeword into the one slot.

Figure 8:
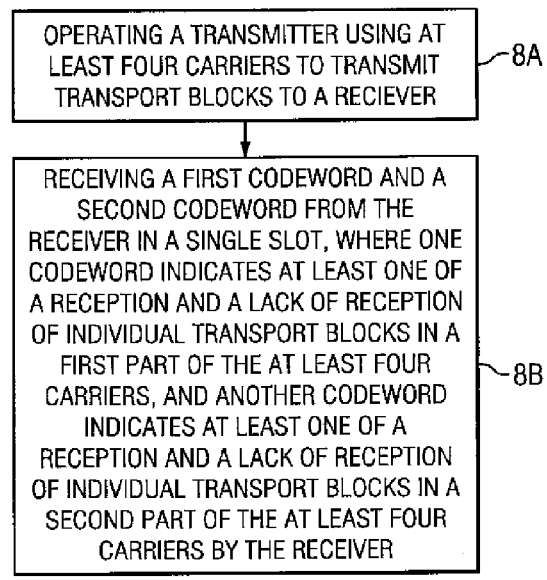

Further, in accordance with the example method of FIG. 7 as indicated in at least the two paragraphs above the transmitting comprises transmitting the first codeword and the second codeword with the third codeword and the fourth codeword using one of separate spreading codes or separate uplink carriers FIG. 8 is a logic flow diagram that illustrates the operation of a method, and a result of execution of computer program instructions, further in accordance with the exemplary embodiments of this invention. In accordance with these exemplary embodiments a method performs, at Block 8A, a step of operating a transmitter using at least four carriers to transmit transport blocks to a receiver. At Block 8B there is a step of receiving a first codeword and a second codeword from the receiver in a single slot, where one codeword indicates at least one of a reception and a lack of reception of individual transport blocks in a first part of the at least four carriers, and where another codeword indicates a lack of reception of individual transport blocks in a second part of the at least four carriers by the receiver.

Further, in accordance with the example method of FIG. 8 above the first codeword and the second codeword is received in an acknowledgement message during the slot.

In accordance with the example method of FIG. 8 as indicated in the paragraph above the acknowledgement message is 20 bits.

Further, in accordance with the example method of FIG. 8 as indicated in the paragraphs above the first codeword and the second codeword are one of concatenated or interleaved in the slot.

Additionally, in accordance with the example method of FIG. 8 as indicated in the paragraphs above at least one codeword received from the receiver comprises a discontinuous transmission message if no transport blocks is transmitted in the corresponding part of the at least four carriers.

Further, in accordance with the example method of FIG. 8 as indicated in the paragraphs above there is operating a receiver using eight carriers, composing a third codeword to acknowledge at least one of a reception and a lack of reception of individual transport blocks in a third part of the eight carriers, composing a fourth codeword to acknowledge at least one of a reception and a lack of reception of individual transport blocks in a fourth part of the eight carriers, and transmitting the third codeword and the fourth codeword to the transmitter during the one slot.

Further, in accordance with the example method of FIG. 8 as indicated in the paragraph above the transmitting comprises one of concatenating or interleaving the first codeword and the second codeword with the third codeword and the fourth codeword into the one slot.

Further, in accordance with the example method of FIG. 8 as indicated in at least the two paragraphs above where the transmitting comprises transmitting the first codeword and the second codeword with the third codeword and the fourth codeword using one of separate spreading codes or separate uplink carriers.

The various blocks shown in FIGS. 5, 6, 7, and 8 may be viewed as method steps, and/or as operations that result from operation of computer program code, and/or as a plurality of coupled logic circuit elements constructed to carry out the associated function(s).

The exemplary embodiments thus also provide an apparatus that comprises a processor and a memory including computer program code, where the memory and computer program code are configured to, with the processor, cause the apparatus at least to perform operating a receiver using at least four carriers to receive transport blocks from a transmitter; composing a first codeword to acknowledge the correct reception and/or the incorrect reception of individual transport blocks in a part of the at least four carriers, and composing a second codeword to indicate a lack of reception of another part of the at least four carriers; and transmitting the first and second composed codewords to the transmitter during one slot.

The exemplary embodiments thus also provide an apparatus that comprises a processor and a memory including computer program code, where the memory and computer program code are configured to, with the processor, cause the apparatus at least to perform operating a transmitter using at least four carriers to transmit transport blocks to a receiver; and receiving a first codeword and a second codeword from the receiver in single slot, where one codeword acknowledges the correct reception and/or the incorrect reception of individual transport blocks in a part of the at least four carriers, and another codeword indicates a lack of reception of another part of the at least four carriers by the receiver.

The exemplary embodiments also provide a computer-readable data storage medium containing a data structure. The data structure is comprised of a plurality of codewords. Individual ones of the codewords are constructed to acknowledge the correct reception and/or the incorrect reception of individual transport blocks in a part of at least four carriers. The data structure is further comprised of an additional codeword to indicate a lack of reception in another part of the at least four carriers. The codewords are intended to be selected and transmitted two to a slot, either concatenated together or interleaved together.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the HSPA system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

The various names assigned to different channels are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   operating a receiver using at least four carriers to receive transport blocks from a transmitter;
   composing a first codeword to correspond to a first part of the at least four carriers and to indicate at least one of a reception and a lack of reception of individual transport blocks in the first part of the at least four carriers, wherein the first part comprises at least two carriers;
   composing a second codeword to correspond to a second part of the at least four carriers and to indicate at least one of a reception and a lack of reception of individual transport blocks in the second part of the at least four carriers, wherein the second part comprises at least two carriers; and
   transmitting the first codeword and the second codeword to the transmitter during one slot, where at least one of the first codeword and the second codeword transmitted to the transmitter during the slot is composed to indicate a lack of reception of a transport block in the at least two carriers of the corresponding at least one of the first part or the second part of the at least four carriers.

2. The method of claim 1, where the first codeword and the second codeword are transmitted in an acknowledgement message field during the slot.

3. The method of claim 2, where the acknowledgement message field is 20bits in length.

4. The method of claim 1, where the first codeword and the second codeword are one of concatenated or interleaved in the slot.

5. The method of claim 1, where the receiver is using eight carriers, the method further comprising:
   composing a third codeword to correspond to a third part of the eight carriers to indicate at least one of a reception and a lack of reception of individual transport blocks in the third part of the eight carriers;
   composing a fourth codeword to correspond to a fourth part of the eight carriers to indicate at least one of a reception and a lack of reception of individual transport blocks in the fourth part of the eight carriers; and
   transmitting the third codeword and the fourth codeword to the transmitter.

6. The method of claim 5, where the transmitting comprises one of concatenating or interleaving the first codeword and the second codeword with the third codeword and the fourth codeword into one slot.

7. The method of claim 5, where the transmitting comprises transmitting the first codeword and the second codeword with the third codeword and the fourth codeword using one of separate spreading codes or separate uplink carriers.

8. A non-transitory computer-readable medium that contains software program instructions, wherein execution of the software program instructions by at least one data processor results in performance of operations that comprise execution of the method according to claim 1.

9. An apparatus comprising:
   at least one processor; and
   at least one memory including computer program code, where the at least one memory and the computer program code are configured, with the at least one processor, to cause the apparatus to at least:
   operate a receiver using at least four carriers to receive transport blocks from a transmitter;
   compose a first codeword to correspond to a first part of the at least four carriers to indicate at least one of a reception and a lack of reception of individual transport blocks in the first part of the at least four carriers, wherein the first part comprises at least two carriers;
   compose a second codeword to correspond to a second part of the at least four carriers to indicate at least one of a reception and a lack of reception of individual transport blocks the second part of the at least four carriers, wherein the second part comprises at least two carriers; and
   transmit the first codeword and the second codeword to the transmitter during one slot, where at least one of the first codeword and the second codeword transmitted to the transmitter during the slot is composed to indicate a lack of reception of a transport block in the at least two carriers of the corresponding at least one of the first part or the second part of the at least four carriers.

10. The apparatus of claim 9, where the first codeword and the second codeword are transmitted in an acknowledgement message field during the slot.

11. The apparatus of claim 10, where the acknowledgement message field is 20bits in length.

12. The apparatus of claim 9, where the first codeword and the second codeword are one of concatenated or interleaved in the slot.

13. The apparatus of claim 9, where the at least one memory including the computer program code is configured, with the at least one processor, to cause the apparatus to:

operate a receiver using eight carriers;

compose a third codeword to correspond to a third part of the eight carriers to indicate at least one of a reception and a lack of reception of individual transport blocks in the third part of the eight carriers;

compose a fourth codeword to correspond to a fourth part of the eight carriers to indicate at least one of a reception and a lack of reception of individual transport blocks in a fourth part of the eight carriers; and transmit the third codeword and the fourth codeword to the transmitter during the one slot.

14. The apparatus of claim 13, where the transmitting comprises one of concatenating or interleaving the first codeword and the second codeword with the third codeword and the fourth codeword into the one slot.

15. The apparatus of claim 13, where the transmitting comprises transmitting the first codeword and the second codeword with the third codeword and the fourth codeword using one of separate spreading codes or separate uplink carriers.

16. A method comprising:
operating a transmitter using at least four carriers to transmit transport blocks to a receiver; and
receiving a first codeword and a second codeword from the receiver in a single slot,
where one codeword is corresponding to a first part of the at least four carriers and indicates at least one of a reception and a lack of reception of individual transport blocks in the first part of the at least four carriers, wherein the first part comprises at least two carriers, and
where another codeword is corresponding to a second part of the at least four carriers and indicates a lack of reception of individual transport blocks in the second part of the at least four carriers by the receiver, wherein the second part comprises at least two carriers, and
where at least one of the first codeword and the second codeword received from the receiver is composed to indicate a lack of reception of a transport block in the at least two carriers of the corresponding at least one of the first part or the second part of the at least four carriers.

17. The method of claim 16, where the first code word and the second codeword are received in an acknowledgement message field during the slot.

18. The method of claim 17, where the acknowledgement message field is 20bits in length.

19. The method of claim 16, where the first codeword and the second codeword are one of concatenated or interleaved in the slot.

20. A non-transitory computer-readable medium that contains software program instructions, wherein execution of the software program instructions by at least one data processor results in performance of operations that comprise execution of the method according to claim 16.

21. An apparatus comprising:
at least one processor; and
at least one memory including computer program code, where the at least one memory and the computer program code are configured, with the at least one processor, to cause the apparatus to at least:
operate a transmitter using at least four carriers to transmit transport blocks to a receiver; and
receive at least a first codeword and a second codeword from the receiver in a single slot,
where one codeword is corresponding to a first part of the at least four carriers and indicates at least one of a reception and a lack of reception of individual transport blocks in the first part of the at least four carriers, where the first part comprises at least two carriers, and
where another codeword is corresponding to a second part of the at least four carriers and indicates a lack of reception of individual transport blocks in the second part of the at least four carriers by the receiver, where the second part comprises at least two carriers, and where at least one of the first and the second codeword received from the receiver is composed to indicate a lack of reception of a transport block in the at least two carriers of the corresponding at least one of the first part or the second part of the at least four carriers.

22. The apparatus of claim 21, where the first code word and the second codeword are received in an acknowledgement message field during the slot.

23. The apparatus of claim 22, where the acknowledgement message is 20bits in length.

24. The apparatus of claim 21, where the at least the first codeword and the second codeword are one of concatenated or interleaved in the slot.

25. The method of claim 1, where each of the first part and the second part comprise different carriers of the at least four carriers.

* * * * *